United States Patent
He et al.

(10) Patent No.: US 11,429,367 B2
(45) Date of Patent: Aug. 30, 2022

(54) MANAGING LIFECYCLE OF VIRTUALIZATION SOFTWARE IN A VIRTUALIZED COMPUTING SYSTEM

(71) Applicant: VMware, Inc., Palo Alto, CA (US)

(72) Inventors: Lingyuan He, Sunnyvale, CA (US); Mukund Gunti, Sunnyvale, CA (US); Ashish Kaila, Cupertino, CA (US); Aravinda Haryadi, Bangalore (IN)

(73) Assignee: VMware, Inc., Palo Alto, CA (US)

(*) Notice: Subject to any disclaimer, the term of this patent is extended or adjusted under 35 U.S.C. 154(b) by 2 days.

(21) Appl. No.: 17/150,606

(22) Filed: Jan. 15, 2021

(65) Prior Publication Data
US 2022/0229644 A1    Jul. 21, 2022

(51) Int. Cl.
G06F 8/61 (2018.01)
G06F 11/10 (2006.01)
G06F 21/57 (2013.01)
G06F 8/71 (2018.01)

(52) U.S. Cl.
CPC ............ *G06F 8/61* (2013.01); *G06F 8/71* (2013.01); *G06F 11/1004* (2013.01); *G06F 21/572* (2013.01)

(58) Field of Classification Search
CPC .......... G06F 8/61; G06F 8/71; G06F 11/1004; G06F 21/572
See application file for complete search history.

(56) References Cited

U.S. PATENT DOCUMENTS

| | | | | |
|---|---|---|---|---|
| 7,590,864 B2* | 9/2009 | Khan | ...................... | G06F 21/71 713/189 |
| 7,735,078 B1* | 6/2010 | Vaidya | ................ | G06F 9/44547 717/171 |
| 8,495,612 B2* | 7/2013 | Bertrand | ................... | G06F 8/65 717/170 |
| 8,539,469 B2* | 9/2013 | Blumfield | ................. | G06F 8/65 717/168 |
| 8,584,114 B2* | 11/2013 | Rabinovich | ............... | G06F 8/51 717/174 |
| 9,009,694 B2* | 4/2015 | DiRico | .................... | G06F 9/453 717/168 |
| 9,164,754 B1* | 10/2015 | Pohlack | .................. | G06F 8/658 |
| 9,513,895 B2* | 12/2016 | Inamdar | .................... | G06F 8/65 |
| 10,514,904 B2* | 12/2019 | Saraswati | ............... | G06F 8/656 |
| 10,795,659 B1* | 10/2020 | Kinsburskiy | ............. | G06F 8/65 |
| 2003/0033597 A1* | 2/2003 | Allsop | ....................... | G06F 8/61 717/169 |
| 2003/0221190 A1* | 11/2003 | Deshpande | ............... | G06F 8/61 717/171 |

(Continued)

*Primary Examiner* — Douglas M Slachta
(74) *Attorney, Agent, or Firm* — Kim & Stewart LLP

(57) ABSTRACT

An example method of managing a lifecycle of virtualization software in a host is described. The method includes: obtaining, by an initiator in a current version of the virtualization software, a software installation bundle (SIB) from an image repository for a target version of the virtualization software, the SIB including a patcher; verifying, by the initiator, authenticity of the SIB; mounting at least one payload of the SIB in a root filesystem of the virtualization software, and initiating, by the initiator, the patcher in the at least one payload as mounted to perform at least one check operation.

17 Claims, 8 Drawing Sheets

(56) References Cited

U.S. PATENT DOCUMENTS

| | | | | |
|---|---|---|---|---|
| 2004/0088697 A1* | 5/2004 | Schwartz | ............... | G06F 8/61 |
| | | | | 717/174 |
| 2006/0112152 A1* | 5/2006 | Napier | ............... | G06F 8/658 |
| 2007/0106979 A1* | 5/2007 | Felts | ............... | G06F 9/44536 |
| | | | | 717/124 |
| 2009/0187899 A1* | 7/2009 | Mani | ............... | G06F 8/65 |
| | | | | 717/168 |
| 2012/0089973 A1* | 4/2012 | Bhat | ............... | G06F 8/658 |
| | | | | 717/169 |
| 2015/0100955 A1* | 4/2015 | Chen | ............... | G06F 8/658 |
| | | | | 717/170 |
| 2015/0363187 A1* | 12/2015 | Dhar | ............... | G06F 8/65 |
| | | | | 713/2 |
| 2017/0177325 A1* | 6/2017 | Carranza | ............... | G06F 8/658 |
| 2019/0155598 A1* | 5/2019 | Bainville | ............... | G06F 8/71 |

* cited by examiner

MANAGING LIFECYCLE OF VIRTUALIZATION SOFTWARE IN A VIRTUALIZED COMPUTING SYSTEM

BACKGROUND

In many virtualization computing systems, virtualization software is installed on a cluster of hosts using an ISO image that is created from a flat list of software installation bundles (SIBs). An SIB is the smallest unit of software that can be shipped and installed, and these SIBs make up, for example, a base hypervisor image (hereinafter also referred to as "base image") from a virtualization software provider, as well as drivers, agents, and other software components from an OEM (original equipment manufacturer) and other vendors of hardware. In a typical installation, hundreds of these SIBs are packaged as one or more ISO images and installed in the hosts.

After installation, lifecycle management of the virtualization software becomes cumbersome and error-prone. Although different software developers create new versions or updates to the SIBs, the new versions or updates cannot be released independently. The releases have to be tightly controlled because it is likely that one SIB has a dependency to another SIB. As a result, new releases are made in the form of bulletins, which are a collection of software installation bundles, or as a new ISO image in which new SIBs from the virtualization software provider, the OEM, and other software vendors are packaged. Because of the interdependencies and the integration of the newly developed SIBs with other SIBs, it is difficult to make piecemeal changes to the virtualization software for easy consumption by an end user during the lifecycle of the virtualization software.

SUMMARY

One or more embodiments provide a method of managing a lifecycle of virtualization software in a host. The method includes: obtaining, by an initiator in a current version of the virtualization software, a software installation bundle (SIB) from an image repository for a target version of the virtualization software, the SIB including a patcher; verifying, by the initiator, authenticity of the SIB; mounting at least one payload of the SIB in a root filesystem of the virtualization software; and initiating, by the initiator, the patcher in the at least one payload as mounted to perform at least one check operation.

Further embodiments include a non-transitory computer-readable storage medium comprising instructions that cause a computer system to carry out the above method, as well as a computer system configured to carry out the above method.

DETAILED DESCRIPTION

Managing lifecycle of virtualization software in a virtualized computing system is described. In embodiments described herein, a virtualized computing system includes a software-defined datacenter (SDDC) comprising a server virtualization platform integrated with a logical network platform. The server virtualization platform includes clusters of physical servers ("hosts") referred to as "host clusters." Each host cluster includes a virtualization layer, executing on host hardware platforms of the hosts, which supports execution of virtual machines (VMs) A virtualization management server manages host clusters, the virtualization layers, and the VMs executing thereon. The virtualized computing system utilizes a "patch the patcher" process to manage the lifecycle of the virtualization software on each host, such as patching or upgrading the virtualization software. In the patch the patcher process, lifecycle software obtains a software installation bundle (SIB) for the target image that includes a new patcher for the target version. An old patcher of the current version is used to verifying the SIB, securely mount its payloads, and initiation execution of scripts/binaries of the new patcher. The scripts/binaries can perform various check operations, such as pre-checks, post-checks, etc., as well as patch or upgrade operations. The new patcher executes instead of the old patcher and can be removed in case a patch or upgrade operation is not performed, leaving the old patcher in place. These and further advantages are discussed below with respect to the drawings.

Figure 1:
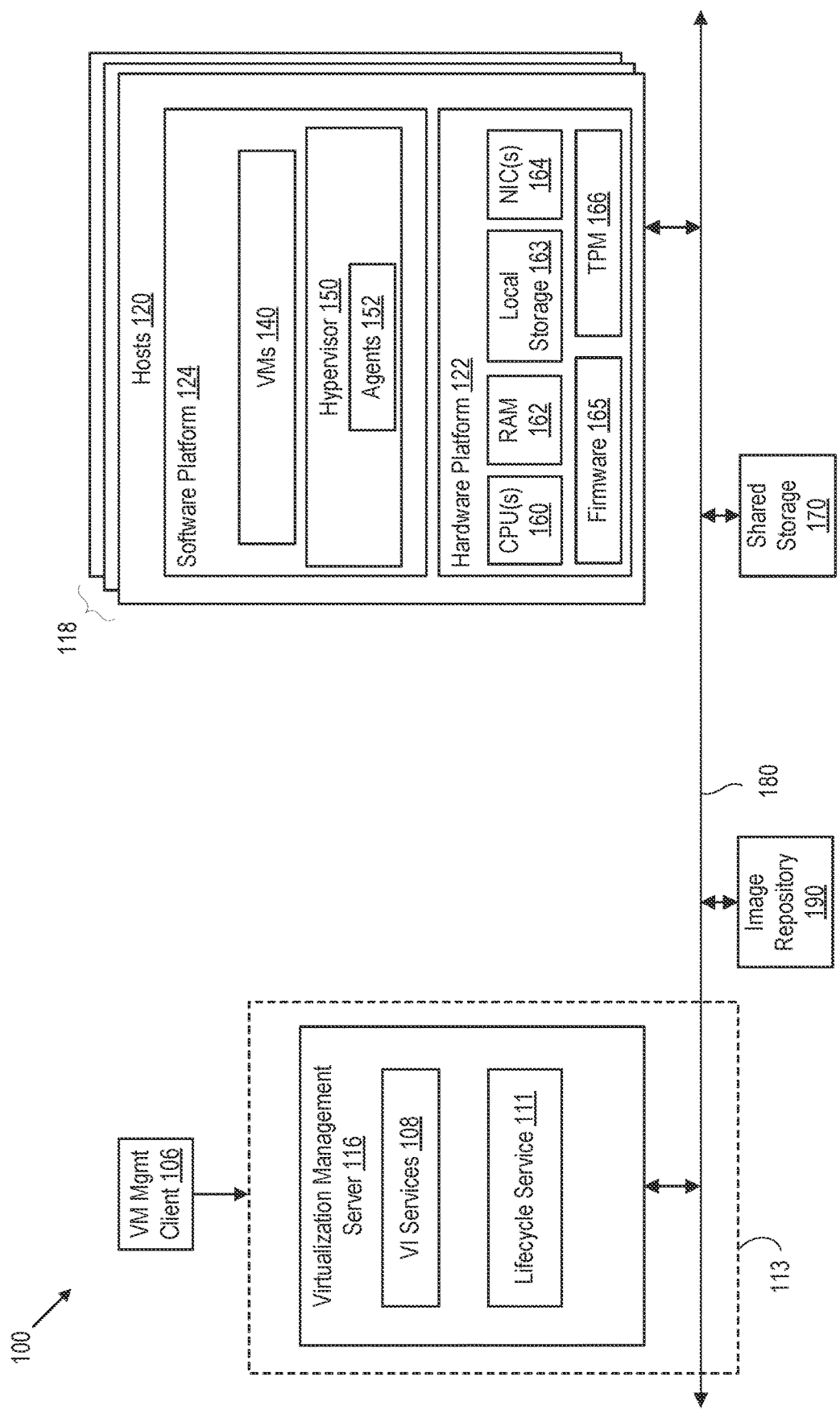
FIG. 1 is a block diagram of a virtualized computing system in which embodiments described herein may be implemented.

FIG. 1 is a block diagram of a virtualized computing system 100 in which embodiments described herein may be implemented. System 100 includes a cluster of hosts 120 ("host cluster 118") that may be constructed on server-grade hardware platforms such as an x86 architecture platforms. For purposes of clarity, only one host cluster 118 is shown. However, virtualized computing system 100 can include many of such host clusters 118. As shown, a hardware platform 122 of each host 120 includes conventional components of a computing device, such as one or more central processing units (CPUs) 160, system memory (e.g., random access memory (RAM) 162), one or more network interface controllers (NICs) 164, and optionally local storage 163. CPUs 160 are configured to execute instructions, for example, executable instructions that perform one or more operations described herein, which may be stored in RAM 162. NICs 164 enable host 120 to communicate with other devices through a physical network 180. Physical network 180 enables communication between hosts 120 and between other components and hosts 120 (other components discussed further herein). Physical network 180 can include a plurality of virtual local area networks (VLANs) to provide external network virtualization as described further herein. Hardware platform 122 can further include firmware 165 and a trusted platform module (TPM) 166, described further herein.

In the embodiment illustrated in FIG. 1, hosts 120 access shared storage 170 by using NICs 164 to connect to network 180. In another embodiment, each host 120 contains a host bus adapter (HBA) through which input/output operations (IOs) are sent to shared storage 170 over a separate network (e.g., a fibre channel (FC) network). Shared storage 170 include one or more storage arrays, such as a storage area network (SAN), network attached storage (NAS), or the like. Shared storage 170 may comprise magnetic disks, solid-state disks, flash memory, tape and the like as well as combinations thereof. In some embodiments, hosts 120 include local storage 163 (e.g., hard disk drives, solid-state drives, etc.). Local storage 163 in each host 120 can be aggregated and provisioned as part of a virtual SAN, which is another form of shared storage 170.

A software platform 124 of each host 120 provides a virtualization layer, referred to herein as a hypervisor 150, which directly executes on hardware platform 122. In an embodiment, there is no intervening software, such as a host operating system (OS), between hypervisor 150 and hardware platform 122. Thus, hypervisor 150 is a Type-1 hypervisor (also known as a "bare-metal" hypervisor). As a result, the virtualization layer in host cluster 118 (collectively hypervisors 150) is a bare-metal virtualization layer executing directly on host hardware platforms. Hypervisor 150 abstracts processor, memory, storage, and network resources of hardware platform 122 to provide a virtual machine execution space within which multiple virtual machines (VM) may be concurrently instantiated and executed. One example of hypervisor 150 that may be configured and used in embodiments described herein is a VMware ESXi™ hypervisor provided as part of the VMware vSphere® solution made commercially available by VMware, Inc. of Palo Alto, Calif. Hypervisor 150 manages virtual machines (VMs) 140 executing thereon. VMs 140 support applications deployed onto host cluster 118, which can include containerized applications or applications executing directly on guest operating systems (non-containerized).

Virtualization management server 116 is a physical or virtual server that manages host cluster 118 and the virtualization layer therein. Virtualization management server 116 installs agent(s) 152 in hypervisor 150 to add a host 120 as a managed entity. Virtualization management server 116 logically groups hosts 120 into host cluster 118 to provide cluster-level functions to hosts 120, such as VM migration between hosts 120 (e.g., for load balancing), distributed power management, dynamic VM placement according to affinity and anti-affinity rules, and high-availability. The number of hosts 120 in host cluster 118 may be one or many. Virtualization management server 116 can manage more than one host cluster 118.

In an embodiment, system 100 further includes an image repository 190. As described herein, image repository 190 can store image profiles and software installation bundles (SIBs) for hypervisor software. The profiles and SIBs can be downloaded to hosts 120 and used to patch, update, upgrade, etc. hypervisor 150 as described further herein.

Virtualization management server 116 comprises a virtual infrastructure (VI) control plane 113 of virtualized computing system 100. Virtualization management server 116 can include VI services 108 and lifecycle service 111. VI services 108 include various virtualization management services, such as a distributed resource scheduler (DRS), high-availability (HA) service, single sign-on (SSO) service, virtualization management daemon, and the like. DRS is configured to aggregate the resources of host cluster 118 to provide resource pools and enforce resource allocation policies. DRS also provides resource management in the form of load balancing, power management, VM placement, and the like. HA service is configured to pool VMs and hosts into a monitored cluster and, in the event of a failure, restart VMs on alternate hosts in the cluster. A single host is elected as a master, which communicates with the HA service and monitors the state of protected VMs on subordinate hosts. The HA service uses admission control to ensure enough resources are reserved in the cluster for VM recovery when a host fails. SSO service comprises security token service, administration server, directory service, identity management service, and the like configured to implement an SSO platform for authenticating users. The virtualization management daemon is configured to manage objects, such as data centers, clusters, hosts, VMs, resource pools, datastores, and the like. Lifecycle service 111 cooperates with an agent 152 in hypervisor 150 to patch, update, upgrade, etc. the hypervisor software as described further herein.

A VI admin can interact with virtualization management server 116 through a VM management client 106. Through VM management client 106, a VI admin commands virtualization management server 116 to form host cluster 118, configure resource pools, resource allocation policies, and other cluster-level functions, configure storage and networking, patch, update, or upgrade hypervisor software on hosts 120, and the like.

Figure 2:
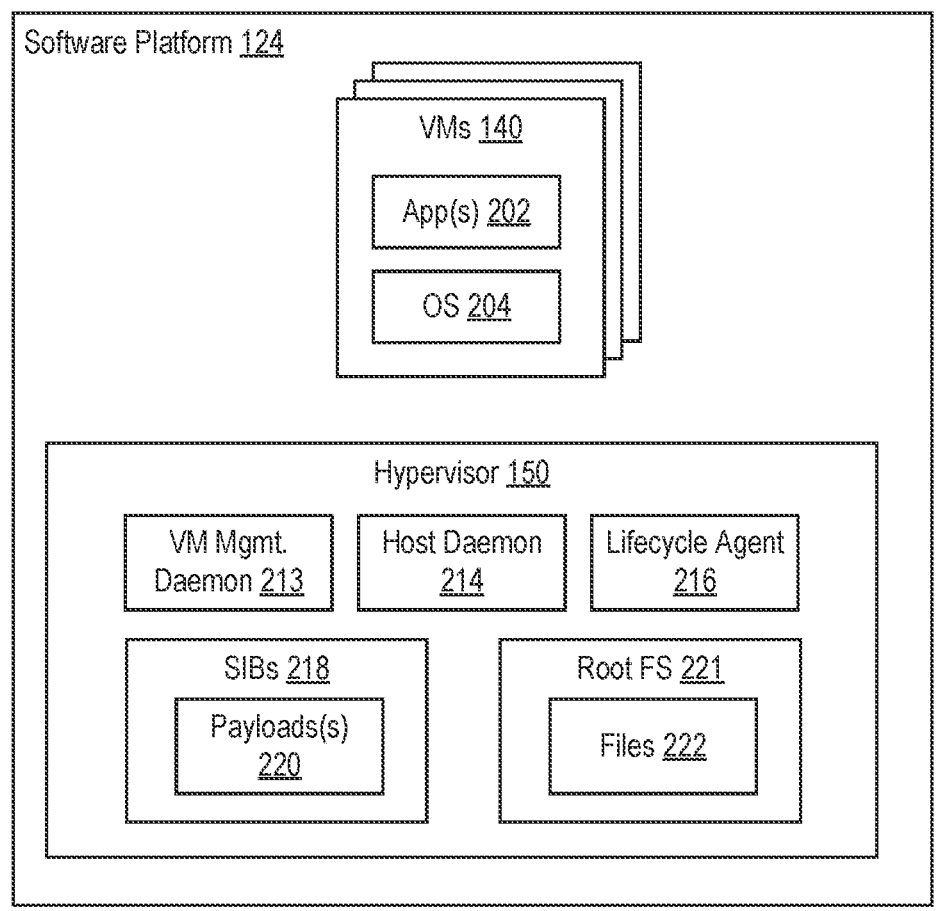
FIG. 2 is a block diagram depicting a software platform according an embodiment.

FIG. 2 is a block diagram depicting software platform 124 according to an embodiment. As described above, software platform 124 of host 120 includes hypervisor 150 that supports execution of VMs 140. Each VM 140 can include an operating system (OS) 204 that supports applications 202. In an embodiment, hypervisor 150 includes a VM management daemon 213, a host daemon 214, lifecycle agent 216, SIBs 218, and a root filesystem (FS) 220. VM management daemon 213 is an agent 152 installed by virtualization management server 116. VM management daemon 213 provides an interface to host daemon 214 for virtualization management server 116. Host daemon 214 is configured to create, configure, and remove VMs 140.

Lifecycle agent 216 cooperates with lifecycle service 111 to manage hypervisor software for hypervisor 150. Lifecycle agent 216 can download SIBs 218 from image repository 190 upon command by lifecycle service 111. Each SIB 218 includes one or more payloads 220. A payload can be a compressed collection of files in a file system structure (e.g., a tardisk or the like). Root FS 221 includes files 222 of hypervisor 150, such as the hypervisor runtime (e.g., kernel, virtual machine monitors, and the like). Root FS 221 is constructed by mounting various payloads 220 from SIBs 218 during boot.

Figure 3A:
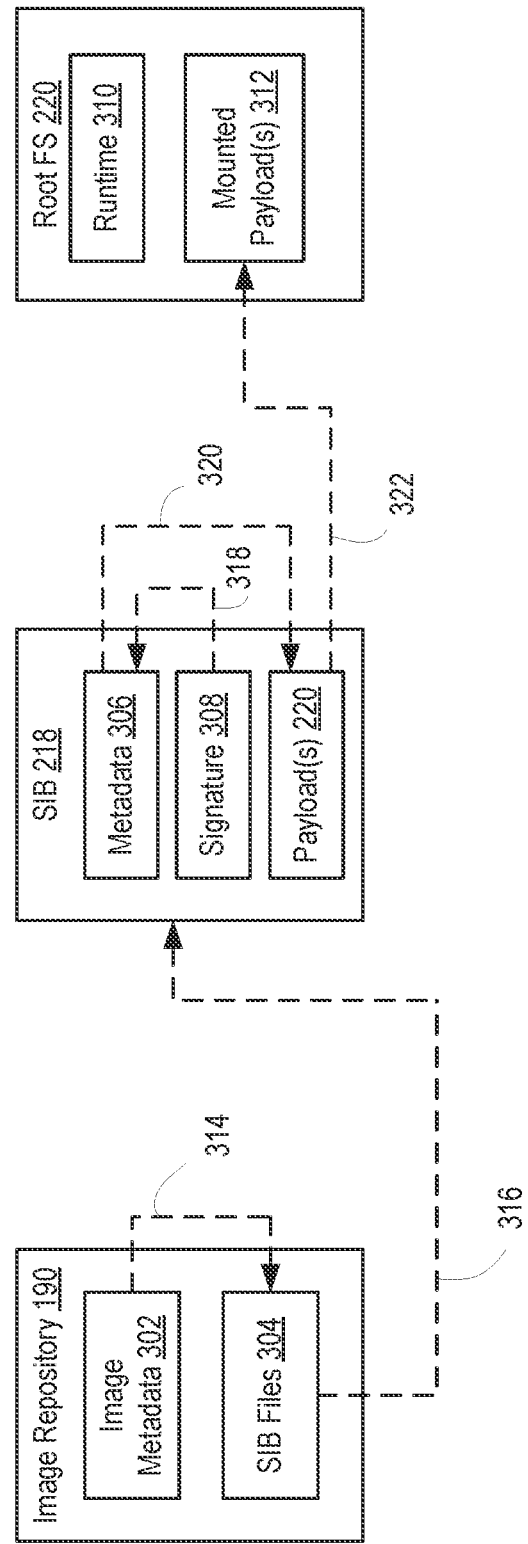
FIGS. 3A and 3B depict a process for installing a software installation bundle in a hypervisor according to an embodiment.
Figure 3B:
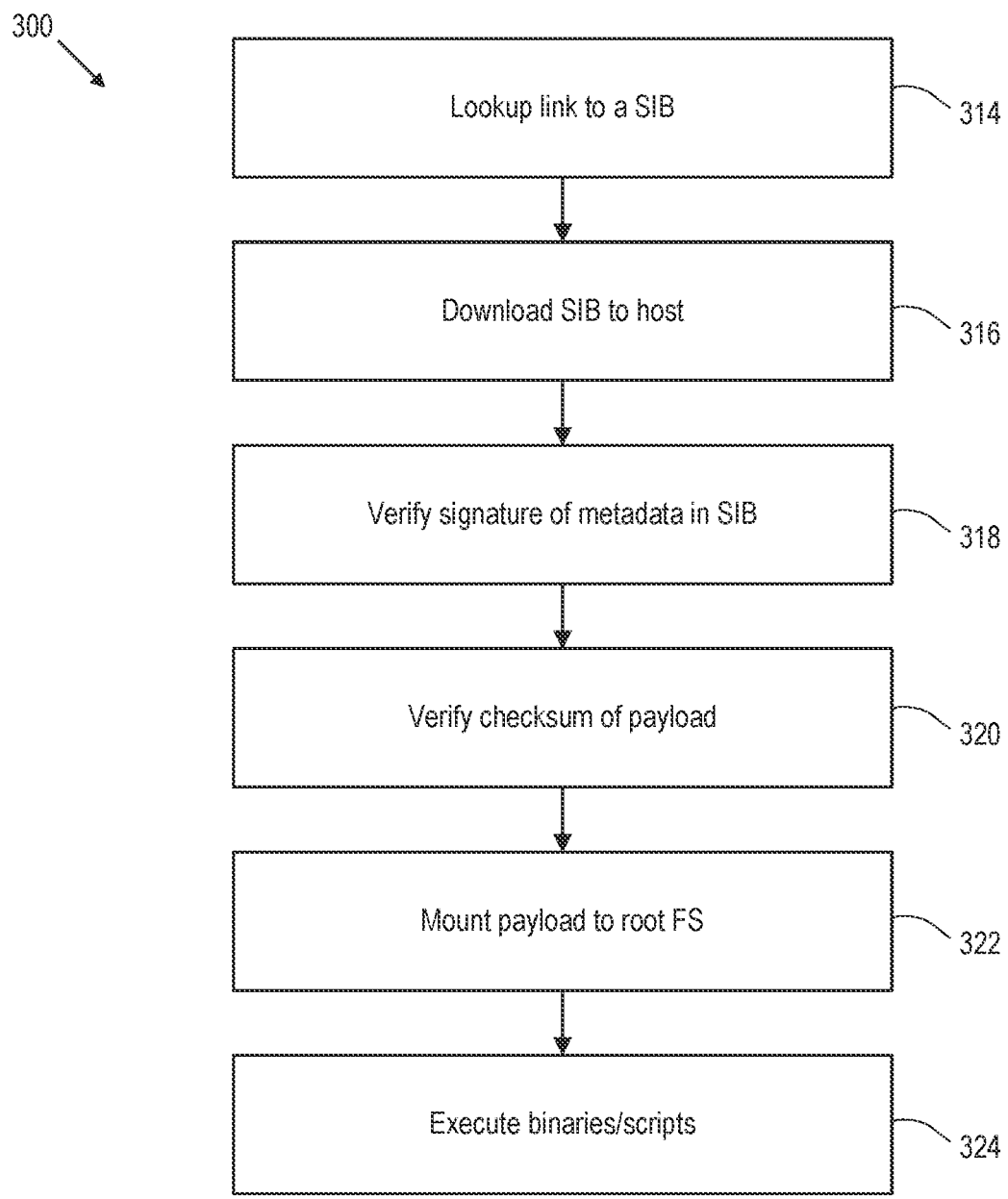

FIGS. 3A and 3B depict a process for installing a software installation bundle in a hypervisor according to an embodiment. As shown in FIG. 3A, image repository 190 includes image metadata 302 and SIB files 304. Image metadata 302 includes information as to which SIB files 304 comprise a target image, which a user has selected. Image repository 190 can include image metadata 302 that provides many choices to form different target images. Each target image can include a specific set of SIB files 304. A SIB file 304 includes a SIB 218. SIB 218 includes metadata 306, a signature 308, and one or more payloads 220. Metadata 306 describes SIB 218. Signature 308 is a cryptographic function of metadata 306 (e.g., a hash or the like) that is authenticated by a trusted source (e.g., using a certificate). Payloads 220 include images of files in a file structure (e.g., a tardisk or the like). Root FS 221 includes the files of hypervisor 150, including runtime 310 and mounted payload(s) 312. Runtime 310 includes the kernel, virtual machine monitors, etc. of hypervisor 150. Mounted payload(s) 312 include those mounted from a SIB 218 in this example installation process.

FIG. 3B shows a flow diagram depicting a method 300 of installing a software installation bundle in a hypervisor according to an embodiment. Method 300 can be understood with reference to FIG. 3A. Method 300 begins a step 314, where lifecycle software (e.g., lifecycle agent 216 and initiator software in hypervisor 150) looks up a link to an SIB 218 in image metadata 302 for a target image. In examples described below, an example SIB 318 is a new patcher SIB that will be used to execute pre-checks, post-checks, upgrade operations, etc. on hypervisor 150. The new patcher SIB will be used to replace an old patcher SIB that is part of the current version of hypervisor 150 as part of the patching/upgrade process where the patcher is being upgraded.

At step 316, lifecycle software downloads SIB 218 to host 120. At step 318, lifecycle software verifies signature 308 of SIB 218 to ensure its authenticity. Lifecycle software can utilize SecureBoot in firmware 165 and/or TPM 166 to provide additional verification as noted below. SecureBoot is a firmware standard that enforces loading of only trusted binaries. TPM is an industry standard for authenticating and attesting the state of software running on a host 120. At step 320, lifecycle software verifies a checksum of each payload 220. The checksums for payloads can be included in metadata 306. This ensures the payloads 220 are not corrupted. At step 322, lifecycle software mounts payloads 220 in root FS 221. At step 324, lifecycle software initiates execution of scripts and/or binaries in the mounted payloads 220. Such execution can be used to perform various functions, such as software pre-checks, software post-checks, patches, upgrades, and the like.

As part of the hypervisor patching/upgrade process, in several stages, formalized prechecks are executed to assure the desired state (image/config) can be applied, or that a remediation step (such as enter maintenance mode) can be performed. Examples of precheck include but are not limited to: Is the host currently in a healthy operating state? Is the host ready to receive the new desired state: image, config and hardware compatibility, VSAN health, and network status/health. Can the host enter maintenance mode, check for DRS status and recommendation, HA health status, VSAN resource status. Can the host exit maintenance mode: VSAN health post-check? Similarly, post remediation verifications can be performed: Is the ESX host currently in a healthy operating state. Is the desired state successfully remediated: verify desired image and config are applied successfully? The pre/post-check framework features the following characteristics/advantages. Check items are detached from the main remediation process, being held in different SIB payloads, and can be added in a flexible manner without any change to the initiator software. In a precheck, check items are securely "extracted" from the desired image (FIGS. 3A-3B) and be executed on the current running system that is pending remediation. The mechanism provides a uniform way to report check result and form user messages including errors, warnings and info.

Aside from signature/security checksum verifications as described above, additional security guarantees can be present when SecureBoot and/or TPM are enabled: only verified SIB can have their payloads mounted (no user override can be given), once mounted the payload will not be able to be altered, including all files/executables enclosed, no untrusted checks will be able to launch even if runtime filesystem is tampered with, etc.

Figure 4:
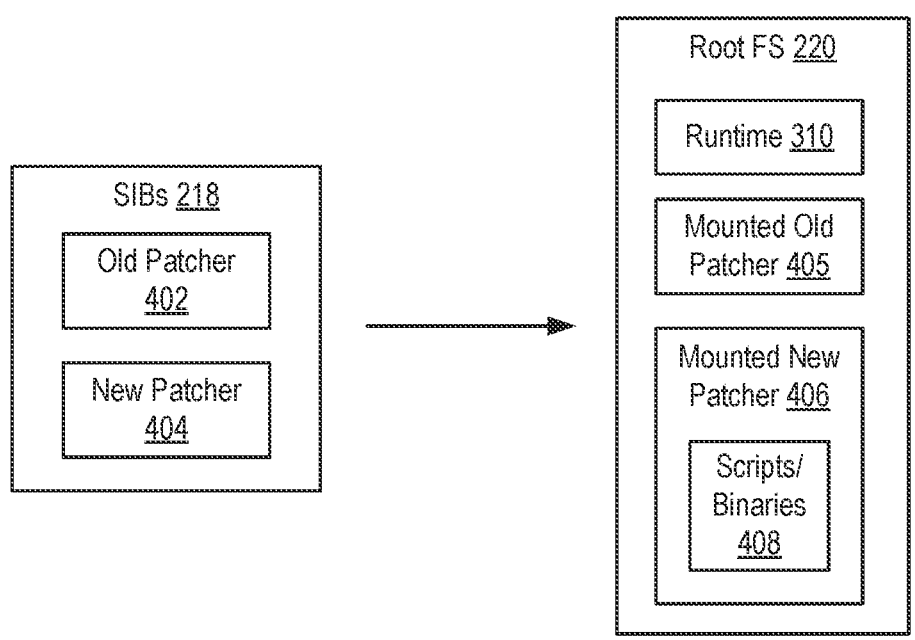
FIG. 4 is a block diagram depicting a state of hypervisor software according to an embodiment.

FIG. 4 is a block diagram depicting a state of hypervisor software according to an embodiment. In embodiments, SIBs 218 can include both an old patcher 402 and a new patcher 404. A patcher is software (e.g., binaries, libraries, etc.) configured to patch/upgrade hypervisor 150. When hypervisor 150 is first installed or last patched/upgraded, hypervisor software includes old patcher 402, which is part of the current version of the hypervisor software. In contrast, new patcher 404 is part of a new version of hypervisor software. Lifecycle agent 216 can download new patcher 404 from image repository 190 prior to patching/upgrading hypervisor software to the new version. New patcher 404 can then be executed to perform the pre-checks, post-checks, patches, upgrades, etc. This is desirable, since there may be many differences between the current version of hypervisor 150 and the new version. In such case, old patcher 402 may not have sufficient capability of performing pre-checks/post-checks since it is based on the older version of hypervisor 150 (e.g., requirements may have changed, new hardware compatibility may have been added, existing hardware capability may have been deprecated, etc.). Lifecycle software can mount payload(s) of new patcher 404 in root FS 221 using the process described above in FIGS. 3A-3B. Mounted new patcher 406 includes scripts/binaries 408 that are to be executed to perform the checks, patch process, etc. Mounted old patcher 405 can be used as the initiator for verifying new patcher 404, mounting new patcher 404, and initiating execution of scripts/binaries 408.

This process is referred to herein as "patch the patcher," since new patcher 404 is being layered on top of old patcher 405. However, old patcher 402 is not removed or changed. Thus, new patcher 404 can be removed in case patching/upgrading is not performed (e.g., the user only desired to perform a compatibility check). The design of the patch the patcher procedure has the following features: Ability to upgrade the system with a new patcher from the target system image; trivial overhead of initiating the upgrade process with patch the patcher; not requiring upgrading just the patcher separately in the upgrade process; and the running system will be unchanged in case a failure occurs, a retry can be attempted without a system reset. Security guarantees of an upgrade process with patch the patcher include: patch the patcher logic, as part of the running system, is trusted and measured; the new patcher is enclosed in a payload whose authenticity/integrity is guaranteed as the current running patcher verifies its signature and security checksum and mounts it in its entirely; the new patcher is mounted as a whole, and individual binaries/scripts therein cannot be altered. New system payloads (SIBs) that are downloaded and installed by the new patcher go through signature verification and security checksum verification to ensure their authenticity. When booting the new image, all running binaries in the booted upgraded system are trusted when loaded, and only measured binaries can execute.

The security mechanisms described above can assist these guarantees: SecureBoot/TPM: when used in conjunction, they guarantee payloads loaded during the boot process can be anchored to a trusted root, all binaries running in the system are measured and trusted, and no untrusted binaries/scripts can execute. This ensures the authenticity of the upgrade initiator that starts patch the patcher, and also that the new system image is not corrupted/tampered with during the new system boot after upgrade. Secure Payload Enclosure and Binary Execution: all files/binaries/scripts can be installed via a payload mount only, any payload mount must go through a check to make sure the payload belongs to a signed SIB and is not corrupted/tampered, and modification to contents in a payload would invalidate its eligibility of trusted execution.

Figure 5:
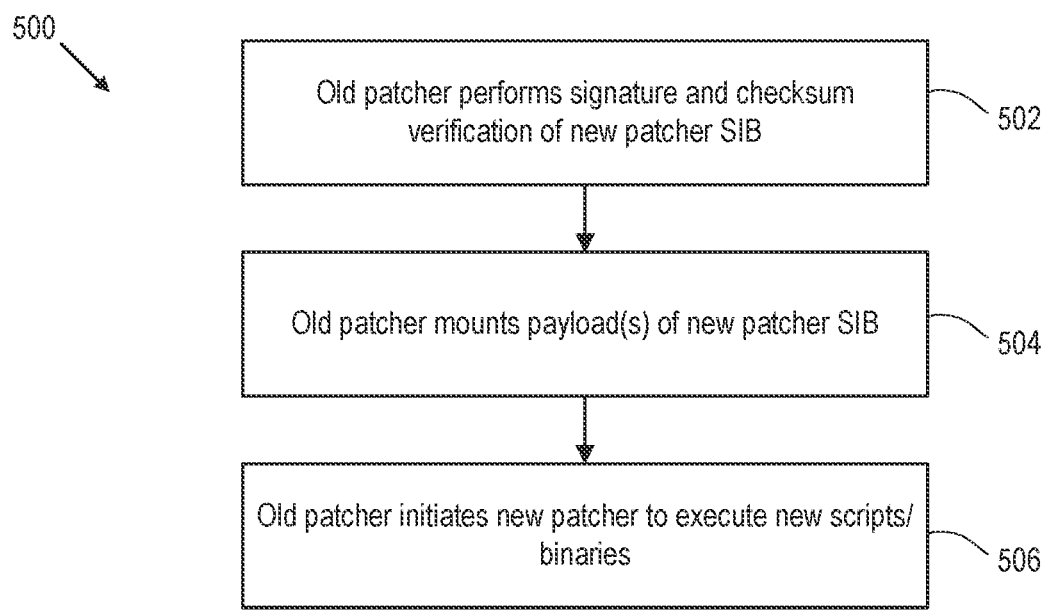
FIG. 5 is a flow diagram depicting a method of initiating a patch the patcher procedure for hypervisor software according to an embodiment.

FIG. 5 is a flow diagram depicting a method 500 of initiating a patch the patcher procedure for hypervisor software according to an embodiment. Method 500 begins at step 502, where old patcher 405 functions as an initiator and performs signature and checksum verification of new patcher 404. Old patcher 405 can also leverage SecureBoot and/or TPM if available to ensure authenticity and integrity of new patcher 404. At step 504, old patcher 405 mounts payload(s) of new patcher SIB in the secure fashion described above. At step 506, old patcher 405 initiates new patcher 404 to execute scripts/binaries 408 therein in order to perform a requested process (e.g., pre-check, post-check, patch, upgrade, etc.).

Figure 6:
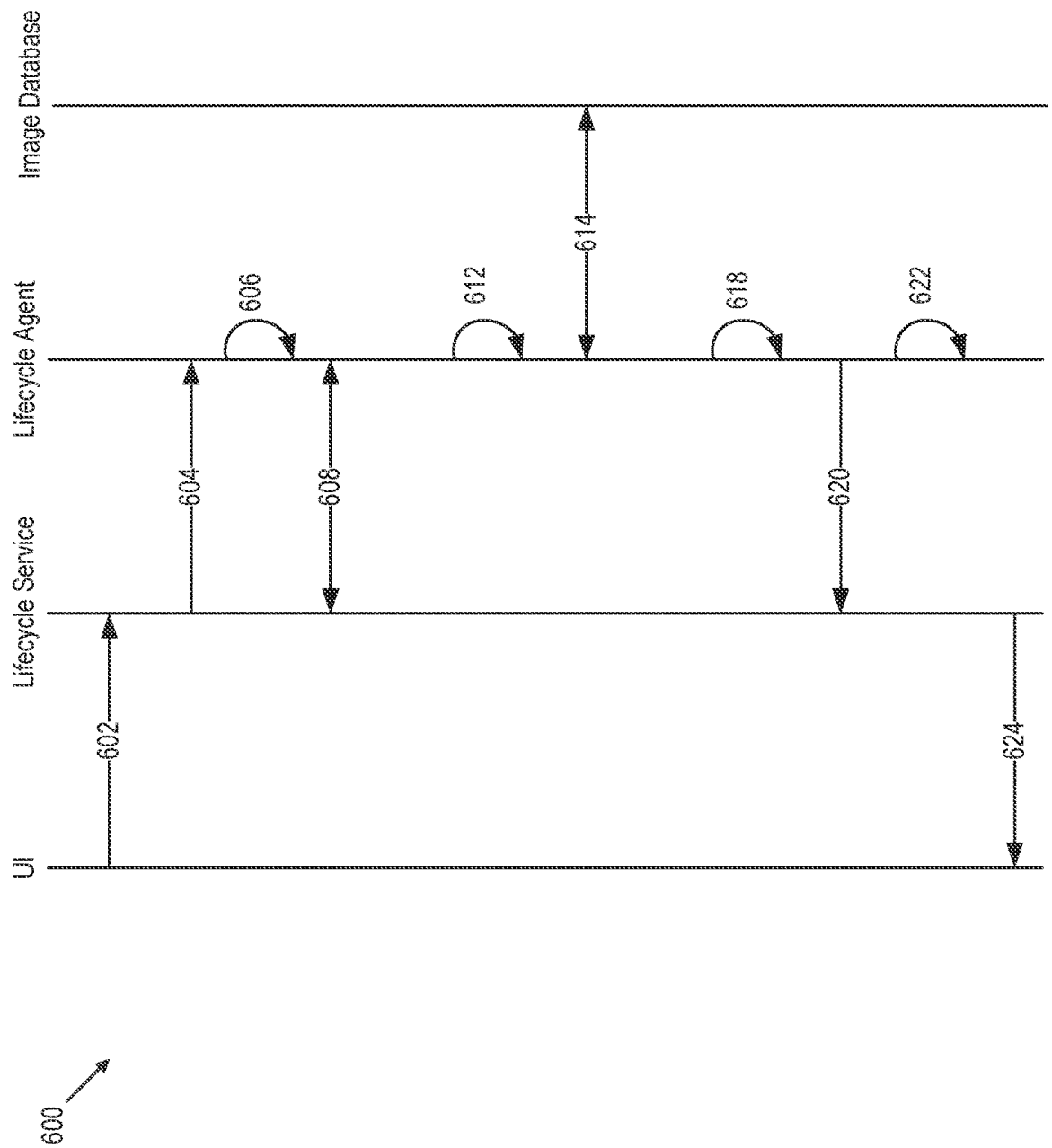
FIGS. 6 and 7 depict a process of performing a software compliance check for hosts executing hypervisor software according to an embodiment.
Figure 7:
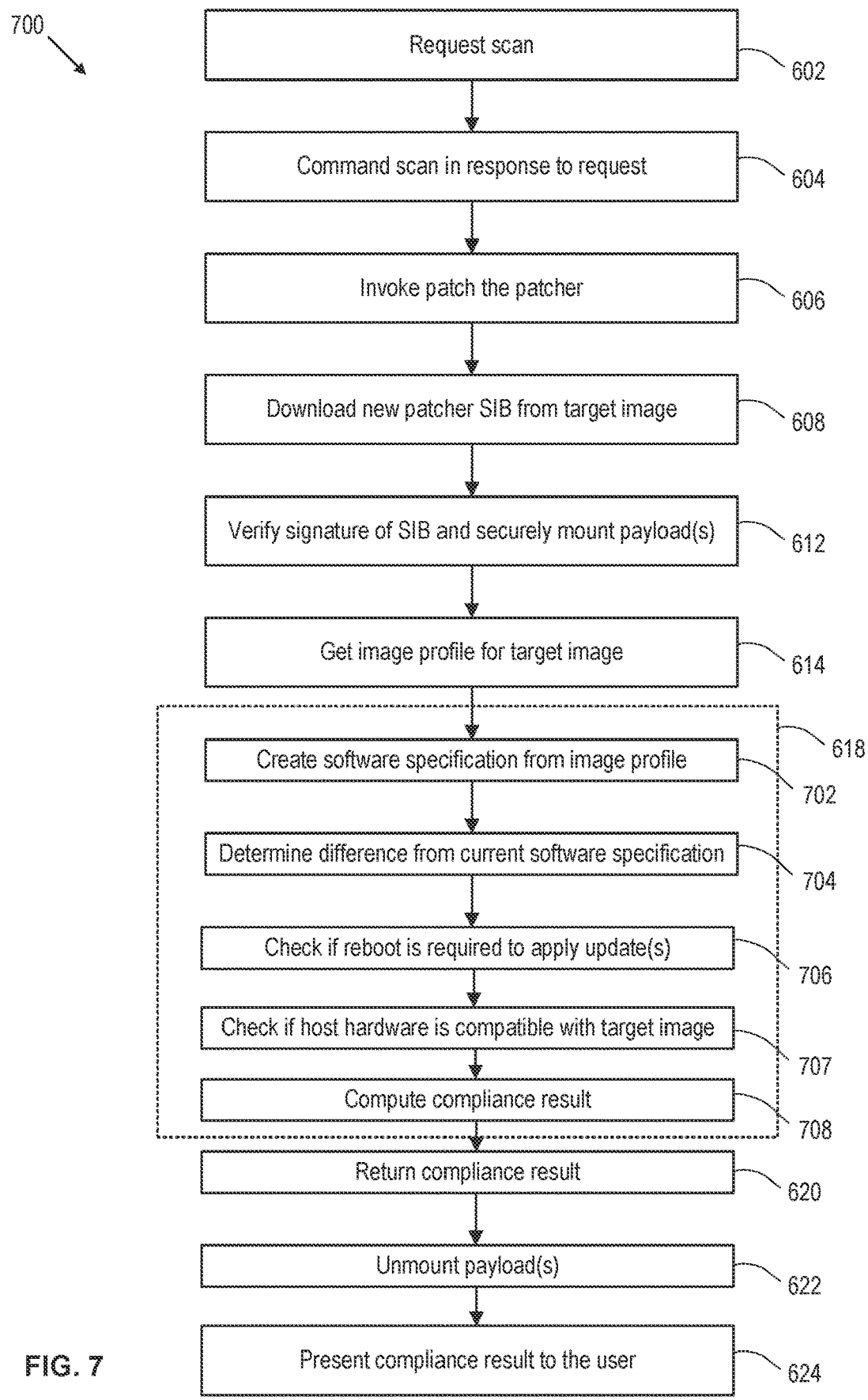

FIGS. 6 and 7 depict a process of performing a software compliance check for hosts executing hypervisor software according to an embodiment. The process can be used to verify a host is ready to have its hypervisor software patched/upgraded from a current version to a target version. FIG. 6 is a signal flow diagram showing the communication between the user interface (UI) of virtualization management server 116, lifecycle service 111, lifecycle agent 216, and image repository 190. FIG. 7 is a flow diagram depicting a method 700 of performing the compliance check. Steps in FIG. 7 that correspond to signals in FIG. 6 are designated with identical reference numerals.

Method 700 begins at step 602, where the UI requests a scan of a host 120. Note that method 700 is described with respect to a single host 120 by way of example, but can be extended for verification of host cluster 118. At step 604, lifecycle service 111 commands lifecycle agent 216 to perform a scan in response to the request. At step 606, lifecycle agent 216 invokes the patch the patcher process described above. Namely, at step 608, lifecycle agent 216 cooperates with initiator (e.g., old patcher 402) to download new patcher SIB for the target image. At step 612, old patcher 402 verifies the signature of the new patcher SIB and securely mounts its payloads as described above. Old patcher 402 then initiates the new patcher. At step 614, new patcher gets the image profile for the target image from image repository 190. Step 618 includes the following actions performed by the new patcher. At step 720, the new patcher creates a software specification from the image profile for the target image. That is, the new patcher parses the image profile to extract the software specification for the target image. At step 722, the new patcher determines the difference between the current software specification and the new software specification. At step 706, the new patcher determines if a reboot is required to apply the patches/updates. At step 707, the new patcher determines if the host hardware is compatible with the target image. At step 708, the new patcher computes a compliance result. At step 620, the new patcher returns the compliance result to lifecycle service 111 (e.g., through lifecycle agent 216). At step 622, the old patcher unmounts the payloads of the new patcher. At step 624, lifecycle service 111 presents the compliance result to the user through the UI.

The embodiments described herein may employ various computer-implemented operations involving data stored in computer systems. For example, these operations may require physical manipulation of physical quantities. Usually, though not necessarily, these quantities may take the form of electrical or magnetic signals, where the quantities or representations of the quantities can be stored, transferred, combined, compared, or otherwise manipulated. Such manipulations are often referred to in terms such as producing, identifying, determining, or comparing. Any operations described herein that form part of one or more embodiments may be useful machine operations.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

The embodiments described herein may be practiced with other computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer readable media. The term computer readable medium refers to any data storage device that can store data which can thereafter be input to a computer system. Computer readable media may be based on any existing or subsequently developed technology that embodies computer programs in a manner that enables a computer to read the programs. Examples of computer readable media are hard drives, NAS systems, read-only memory (ROM), RAM, compact disks (CDs), digital versatile disks (DVDs), magnetic tapes, and other optical and non-optical data storage devices. A computer readable medium can also be distributed over a network-coupled computer system so that the computer readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Virtualization systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data.

Many variations, additions, and improvements are possible, regardless of the degree of virtualization. The virtualization software can therefore include components of a host, console, or guest OS that perform virtualization functions.

Plural instances may be provided for components, operations, or structures described herein as a single instance. Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, additions, and improvements may fall within the scope of the appended claims.

What is claimed is:

1. A method of managing a lifecycle of virtualization software in a host, comprising:
   obtaining, by an old patcher in a current version of the virtualization software, a software installation bundle (SIB) from an image repository for a target version of the virtualization software, the SIB including a new patcher in a target version of the virtualization software;
   verifying, by the old patcher, authenticity of the SIB;
   mounting, by the old patcher, at least one payload of the SIB in a root filesystem of the virtualization software;
   initiating, by the old patcher, the new patcher in the at least one payload as mounted to perform at least one check operation against the virtualization software.

2. The method of claim 1, wherein the step of verifying comprises verifying a signature of the SIB.

3. The method of claim 2, wherein the step of verifying comprises cooperating with at least one of firmware or a trusted platform module (TPM) of the host.

4. The method of claim 1, wherein each of the at least one payload comprises an archive of files having a file structure.

5. The method of claim 1, further comprising performing at least one of a patch operation or an upgrade operation by the patcher subsequent to the at least one check operation.

6. The method of claim 1, wherein the step of mounting comprises verifying a checksum for each of the at least one payload.

7. A non-transitory computer readable medium comprising instructions that are executable in a processor for the processor to carry out a method of managing a lifecycle of virtualization software in a host, comprising:
   obtaining, by an old patcher in a current version of the virtualization software, a software installation bundle (SIB) from an image repository for a target version of the virtualization software, the SIB including a new patcher in a target version of the virtualization software;
   verifying, by the old patcher, authenticity of the SIB;
   mounting, by the old patcher, at least one payload of the SIB in a root filesystem of the virtualization software;
   initiating, by the old patcher, the new patcher in the at least one payload as mounted to perform at least one check operation against the virtualization software.

8. The non-transitory computer readable medium of claim 7, wherein the step of verifying comprises verifying a signature of the SIB.

9. The non-transitory computer readable medium of claim 8, wherein the step of verifying comprises cooperating with at least one of firmware or a trusted platform module (TPM) of the host.

10. The non-transitory computer readable medium of claim 7, wherein each of the at least one payload comprises an archive of files having a file structure.

11. The non-transitory computer readable medium of claim 7, further comprising performing at least one of a patch operation or an upgrade operation by the patcher subsequent to the at least one check operation.

12. The non-transitory computer readable medium of claim 7, wherein the step of mounting comprises verifying a checksum for each of the at least one payload.

13. A computer system comprising a management server, a cluster of hosts in which virtualization software is to be installed or upgraded, wherein the management server is programmed to execute a method of managing a lifecycle of virtualization software in a host, the method comprising:
   obtaining, by an old patcher in a current version of the virtualization software, a software installation bundle (SIB) from an image repository for a target version of the virtualization software, the SIB including a new patcher in a target version of the virtualization software;
   verifying, by the old patcher, authenticity of the SIB;
   mounting, by the old patcher, at least one payload of the SIB in a root filesystem of the virtualization software;
   initiating, by the old patcher, the new patcher in the at least one payload as mounted to perform at least one check operation against the virtualization software.

14. The computer system of claim 13, wherein the step of verifying comprises verifying a signature of the SIB.

15. The computer system of claim 14, wherein the step of verifying comprises cooperating with at least one of firmware or a trusted platform module (TPM) of the host.

16. The computer system of claim 13, wherein each of the at least one payload comprises an archive of files having a file structure.

17. The computer system of claim 13, further comprising performing at least one of a patch operation or an upgrade operation by the patcher subsequent to the at least one check operation.

* * * * *